United States Patent [19]

Liu et al.

[11] Patent Number: 4,749,616

[45] Date of Patent: Jun. 7, 1988

[54] HEAT SEALABLE AQUEOUS LATEX COATING COMPOSITION FOR POLYMER FILM

[75] Inventors: Leland L. Liu, Macedon; Robert H. Steiner, Rochester, both of N.Y.

[73] Assignee: Mobil Oil Corporation, New York, N.Y.

[21] Appl. No.: 876,597

[22] Filed: Jun. 20, 1986

[51] Int. Cl.$^4$ .................... B32B 19/02; B32B 27/08; C08L 33/08; C08L 33/10
[52] U.S. Cl. .................... 428/331; 428/516; 428/520; 428/910; 524/276; 524/277; 524/487; 524/488; 524/493
[58] Field of Search .............. 428/331, 576, 520, 910; 524/487, 493, 488, 276, 277

[56] References Cited

U.S. PATENT DOCUMENTS

| | | |
|---|---|---|
| 3,297,477 | 1/1967 | Barkis et al. |
| 3,753,769 | 8/1973 | Steiner .................... 428/331 |
| 4,058,645 | 11/1977 | Steiner .................... 428/331 |
| 4,291,090 | 9/1981 | Kenji et al. |

*Primary Examiner*—Allan M. Lieberman
*Attorney, Agent, or Firm*—Alexander J. McKillop; Michael G. Gilman; Charles J. Speciale

[57] ABSTRACT

In a heat sealable coating composition for application to a polymer film wherein the composition contains (a) a film-forming aqueous latex based on an interpolymer or blend one or more acrylate esters and, optionally, one or more alpha, beta ethylenically unsaturated carboxylic acids, (b) inorganic particulate hot slip agent and (c) wax-containing cold slip agent, an improvement is provided which comprises the presence therein of such an aqueous latex in which the average particle size of the interpolymer component is from about 0.03 to about 0.5 microns.

20 Claims, No Drawings

HEAT SEALABLE AQUEOUS LATEX COATING COMPOSITION FOR POLYMER FILM

BACKGROUND OF THE INVENTION

The present invention relates to an aqueous latex coating composition for application to polymer film by which the film is rendered heat sealable.

Uncoated polymer films such as oriented polypropylene have very high heat-sealing temperatures and an extremely narrow heat sealing range. Especially in the case of uncoated, oriented polypropylene, such films exhibit a tendency to disorient and shrink when the requisite sealing temperatures are applied to the surface thereof. Attempts have been made to produce coatings for thermoplastic film substrates employing various hydrocarbon resins and mixtures of resins and the like to provide, for example, improved heat seal properties, but in many instances such polymeric coatings have had deleterious effects on the final coated film product such as poor blocking characteristics, inferior optical properties, inadequate heat stability and poor aging characteristics.

The use of latices of thermoplastic polymers with or without minor amounts of other materials, either soluble or insoluble in water, to form a heat sealable coating for thermoplastic film is known. U.S. Pat. No. 3,297,477 describes an aqueous latex heat sealable coating composition for application to a monoaxially or biaxially oriented thermoplastic film such as polypropylene. The coating composition contains from about 5 to about 50% by weight of a homogeneous composition of (1) from 50 to 80%, based on the weight of the composition, of an interpolymer of from 50 to 60 wt percent of a $C_1$-$C_4$ alkyl methacrylate, from 50 to 40 wt percent of $C_1$-$C_4$ alkyl acrylate, and from 1 to 5 wt percent of an acid selected from the group consisting of methacrylic, acrylic and itaconic acid, the individual monomer units not exceeding a total of 100%; (2) from 50 to 20%, based on the weight of the composition, of a compound selected from the group consisting of an adduct of rosin and an alpha-beta unsaturated dicarboxylic acid, and the partial esters of said adduct with a polyhydric alcohol; and (3) from 1 to 5%, based on the weight of the composition, of a wax selected from the group consisting of paraffin wax and microcrystalline hydrocarbon wax, the components of the composition not exceeding a total of 100% by weight.

Another heat sealable coating composition of the latex type, also useful for application to oriented thermoplastic films including those based on polypropylene, is described in U.S. Pat. No. 4,291,090. The coating composition comprises an aqueous dispersion containing, in substantially particulate form, a copolymer formed from (a) at least one alpha, beta-unsaturated carboxylic acid in an amount of from 0.1 to 10% by weight of the copolymer; (b) at least one acrylic ester selected from the group consisting of alkyl acrylates and alkyl methacrylates whose alkyl groups contain from one to twelve carbon atoms; and, (c) at least one copolymerizable hydroxyalkyl ester of alpha, beta-unsaturated carboxylic acids, the amount of component (c) being from 0.1 to 80 percent by weight of the copolymer.

The foregoing coating compositions and those of similar type suffer from deficiencies in several properties including jaw release and hot slip. These two closely related properties are related to the thermoplastic nature of the coating. When the surface of the film is heated sufficiently to achieve heat sealability, the non-sealed surface of the film tends to adhere to the heated sealing jaws and/or to stick to non-heated metal surfaces of the packaging machinery thus, preventing the use of commercially desirable high operating speeds ("machinability"). It has been observed that the addition of substantial amounts of fine particle size colloidal silica to these and other known acrylic copolymer latices as a slip agent to improve their machinability causes the coatings to be extremely hazy and impairs their heat sealability.

U.S. Pat. Nos. 3,753,769 and 4,058,645 each discloses heat sealable coating compositions for oriented polymer films, e.g., those derived from polypropylene, which overcome the machinability deficiencies referred to. The composition of U.S. Pat. No. 3,753,769 contains as a film forming component a resin consisting essentially of an interpolymer of (a) from about 2 to about 15 parts, and preferably from about 2.5 to about 6 parts by weight, of an alpha, beta monoethylenically unsaturated carboxylic acid selected from the group consisting of acrylic acid, methacrylic acid and mixtures thereof, and (b) from about 85 to about 98, and preferably from about 94 to about 97.5 parts by weight, of neutral monomer esters, said neutral monomer esters preferably comprising (1) methyl acrylate or ethyl acrylate and (2) methyl methacrylate. The coating formulation of U.S. Pat. No. 4,058,645 comprises a mixture of a resinous interpolymer consisting essentially of (a) from about 2 to about 15 parts, and preferably from about 2.5 to about 6 parts by weight, of an alpha, beta monoethylenically unsaturated carboxylic acid selected from the group consisting of acrylic acid, methacrylic acid and mixtures thereof, and (b) from about 85 to about 98, and preferably from about 94 to about 97.5 parts by weight, of neutral monomer esters preferably comprising methyl acrylate or ethyl acrylate and methyl methacrylate, the interpolymer being in admixture with from about 2 to about 15 parts by weight of an aqueous-alkali soluble rosin derivative. The coating compositions of both patents are intended to be applied to a substrate polymer film as ammoniacal aqueous solutions containing substantial amounts, e.g., from 30–60 weight percent, of a small particle size colloidal silica as a hot slip agent. Despite such high particle loadings, the heat sealability and high optical clarity of these coatings are not significantly impaired.

SUMMARY OF THE INVENTION

It has now been discovered that by controlling the average particle size of the aqueous acrylate latex component of a heat sealable composition formulated in accordance with this invention within relatively narrow limits, it is possible to obtain a coating possessing excellent optical, heat sealing and machining properties.

In accordance with this invention, in a heat sealable coating composition for application to a polymer film wherein the composition contains (a) a film-forming aqueous latex based on an interpolymer or blend of one or more acrylate esters and, optionally, one or more alpha, beta ethylenically unsaturated carboxylic acids, (b) inorganic particulate hot slip agent and (c) wax-containing cold slip agent, an improvement is provided which comprises the presence therein of such an aqueous latex in which the average particle size of the interpolymer component is from about 0.03 to about 0.5 microns.

DESCRIPTION OF THE PREFERRED EMBODIMENTS

The aqueous latex coating compositions of the present invention when applied to a suitable substrate film, for example, oriented polypropylene, provide coatings possessing improved heat seal properties while simultaneously exhibiting excellent blocking characteristics, hot slip properties, stiffness, and optical properties.

The latex coating resins of the present invention when applied to the surface of a film substrate exhibit relatively high temperature softening points, i.e., on the order of about 120° F. and above. Accordingly, when the coated films, for example, in roll form, are stored over prolonged periods of time it has been found that under normal film storage conditions the overlying film layers exhibit little or no tendency to block due to softening of the coating. This has been a particularly troublesome problem with many prior art resinous coatings for thermoplastic films and is not experienced with the aqueous latex coating compositions of the present invention.

The present invention embodies a thermoplastic article, and particularly a polyolefin film such as polyethylene or polypropylene, which is coated on at least one surface thereof with a thin layer of heat sealable composition. The film is preferably initially pretreated to promote good adhesion of the coating composition.

In order for a latex coating resin to meet necessary commercial requirements such as, for example, being heat sealable at as low a temperature as possible while exhibiting non-blocking characteristics at storage conditions which may be as high as 110° F., it is advantageous that the glass transition temperature (Tg) of the resin be in the range of from about 100° to about 150° F. The Tg may be defined as the temperature at which a polymer changes from a glassy, brittle solid to a very high viscosity liquid, Bueche, "Physical Properties of Polymers," Interscience Publishers, 1962. Tg's can be calculated by a well-known mathematical procedure as, for example, described by T. E. Nielsen in "Mechanical Properties of Polymers," Reinhold Publishing Co., 1962, pp. 22–27. At temperatures below, or for that matter, even slightly above, the Tg, polymers exhibit such great resistance to viscous flow that sealing does not take place regardless of applied pressure or how long the polymer surfaces are maintained in contact with each other.

A heat sealable coating resin should desirably have a molecular weight which is low enough to provide sufficient viscous flow at temperatures moderately above the Tg if a good seal is to be obtained. The aforementioned desirable properties of a heat sealable coating resin can be achieved by controlled synthesis of the polymers. The interpolymers possessing the preferred properties of Tg, acid content, and molecular weight can be produced in accord with the present invention by the proper selection and interpolymerization of the following types of monomers in the presence of a suitable chain transfer agent such as, for example, a mercaptan or halogenated hydrocarbon:

A. A high Tg monomer;
B. A low Tg monomer; and
C. Acid-containing monomers.

Examples of high Tg monomers which can be employed include ethyl methacrylate and methyl methacrylate.

Examples of low Tg monomers which can be employed include, for example, lower alkyl acrylates such as methyl, ethyl or butyl acrylates.

Examples of acid monomers which can be employed include, for example, acrylic acid, methacrylic acid, maleic acid, crotonic acid and mixtures thereof.

The polymerization reaction can be advantageously carried out by adding the mixed monomers incrementally during the reaction in order to attain a more nearly homogeneous distribution of monomers in the multipolymer molecules.

The relative proportions of monomers which can be employed to produce the preferred interpolymer aqueous acrylate latex coating compositions of the present invention can vary and include between about 0 wt % and about 15 wt %, and preferably from about 1 wt % to about 5 wt % of an alpha-beta unsaturated carboxylic acid or mixtures thereof, and from about 85 wt % to 100 wt % and preferably from about 95 wt % to about 99 wt % by weight of the neutral ester monomers.

Thus, the present invention embodies, for example, acrylate terpolymer latices prepared by terpolymerizing ethylenically unsaturated monomers including between about 0 wt % and about 15 wt %, and preferably from about 1.0 wt % to about 5 wt %, of an alpha-beta unsaturated carboxylic acid which is preferably acrylic acid, methacrylic acid or mixtures thereof; about 85 wt % to about 100 wt %, and preferably about 95 wt % to about 99 wt %, by weight of neutral monomer esters comprising (a) an alkyl acrylate ester such as methyl, ethyl or butyl acrylate and (b) alkyl methacrylate esters such as methyl-methacrylate or ethyl methacrylate. The monomer components are generally employed in a ratio such that the alkyl methacrylate monomer is present in an amount of at least about 10 wt % of the total terpolymer composition, and preferably from about 20 to about 80 wt % thereof, and the alkyl acrylate monomer component is present in amounts of at least about 10 wt % of the total coating composition, and preferably from about 80 to about 20 wt % thereof.

Known and conventional emulsion polymerization techniques are contemplated for providing the aqueous latex coating compositions of this invention, care being taken to provide latex emulsions having an average particle size of from about 0.03 to about 0.5 microns and preferably from about 0.07 to about 0.2 microns. Procedures for controlling the average particle size of acrylate latices are well known and are disclosed, e.g., in Bovey, et al., "Emulsion Polymerization", Interscience Publishers, Inc., 1955, the contents of which are incorporated by reference herein. A variety of factors influence ultimate particle size of a latex including the quantity of surface active agent employed (particle size decreases with increasing levels of surface active agent), the method of charging the surface active agent (when all of it is charged initially, smaller particles result), the nature of the surface active agent (anionics tend to produce smaller particles than nonionics at a given level of use), polymerization temperature (lower temperatures favor the formation of smaller particles) and nature of the monomer(s) (in general, the less water soluble monomers produce smaller particles than the more soluble members of a homologous series; even a small amount of a highly water soluble monomer such as acrylic acid or acrylamide can significantly increase particle size).

The use of surface active agents which provide relatively small particle size acrylate latices represents a simple and effective manner of obtaining the desired average particle size herein. For example, the use of the following surface active agents in amounts typical of known and conventional emulsion polymerization procedures will provide latexes whose average particles sizes are within the range of from about 0.03 to about 0.5 microns as required herein: Gafac RE-610 (GAF), a mixture of phosphoric acid esters; the sodium or ammonium salts of Gafac RE-610; a sodium lauryl sulfate, e.g., Sipex SB (Alcolac); and, alkylated diphenyl oxide disulfonate, e.g., Dowfax 2A1 and 3B2 (Dow).

The coating composition of this invention contains a component which imparts "hot slip" to the substrate film, i.e., satisfactory slip properties when the wrapping material or partially wrapped package passes in contact with the heat sealing portions of wrapping apparatus such as heated platens, etc. It is usually defined quantitatively as the coefficient of friction at the temperature and pressure used.

In order to produce a coated wrapping material having the above characteristics, there is applied to the film a composition made up of the terpolymer component as hereinbefore described as the film forming and heat sealing agent together with a solid, finely divided, water insoluble, inorganic material such as colloidal silica, to function as a hot slip agent. Other finely divided inorganic materials which can be used to enhance hot slip properties include such water insoluble solids as diatomaceous earth, calcium silicate, bentonite and finely divided clays. In order to function most efficiently, it is desirable that this finely divided inorganic material have a particle size between about 0.02 and about 0.2 microns, an alkali stabilized silica dispersion being the preferred material for use.

While the amounts of each material required for producing the optimum hot slip properties may vary depending on the specific material used, the nature of the coating compositions and other variables of composition and process, it is preferred to use from about 20 to about 60 wt % (based on the terpolymer) of the slip agent and preferable from about 30 wt % to about 45 wt %.

"Blocking" is the tendency of film to adhere to itself when two or more surfaces of the film are held pressed together, for example, when sheets or mill rolls of the film are stacked in storage. It is more pronounced at elevated temperatures and high relative humidities. Under normal storage conditions, the maximum temperatures encountered will be between about 100° and about 110° F. and the relative humidity may run as high as about 90–100 percent. It is desirable that under these conditions the coated film will not stick to itself, in other words, that it will be resistant to blocking. Otherwise, then the film is stored in rolled form on cores, for example, the layers will adhere to each other and the film will not readily unwind.

Anti-blocking materials which may be used include finely divided waxes and wax-like materials which melt at temperatures above the maximum temperatures encountered in the storage of the film and which are insoluble in the terpolymer at these temperatures. Specific examples are natural waxes such as paraffin wax, microcrystalline wax, beeswax carnauba wax, japan wax, montan wax, etc., and synthetic waxes such as hydrogenated castor oil, chlorinated hydrocarbon waxes, long chain fatty acid amides, etc.

In addition to functioning as anti-blocking materials the above-described wax materials when incorporated into the coating compositions of the present invention also function to improve the "cold-slip" properties of the films coated therewith, i.e., the ability of a film to satisfactorily slide across surfaces at about room temperatures.

A particular type of thermoplastic film which can be advantageously coated with the coating compositions of this invention is molecularly oriented, isotactic polypropylene. After extrusion of the base polypropylene film utilizing conventional extrusion techniques, the film is heated and molecularly oriented by stretching it in both a longitudinal and transverse direction. The resultant oriented film exhibits greatly improved tensile and stiffness properties. However, it is difficult to heat seal by conventional techniques because at the requisite sealing temperature, i.e., on the order of about 350° F., film disorientation and shrinkage occur which results in the film rupturing and tearing apart. However, when such oriented films are subjected to surface treatment methods as described hereinafter and subsequently coated with the present novel coating compositions they can be sealed at temperatures sufficiently low to prevent shrinkage of the substrate, i.e., the oriented polypropylene film. In general, the uncoated substrate films employed in the practice of the present invention are usually from about 0.2 up to about 5 mils in thickness and preferably from about 0.5 to about 1.5 mils.

Before applying the coating composition to the appropriate substrate, the surface of the substrate film can be treated to insure that the coating will be strongly adherent to the film thereby eliminating the possibility of the coating peeling or being stripped from the film. This treatment can be accomplished by employing known prior art techniques such as, for example, film chlorination, i.e., exposure of the film to gaseous chlorine, treatment with oxidizing agents such as chromic acid, hot air or steam treatment, flame treatment and the like. Although any of these techniques can be effectively employed to pretreat the film surface, a particularly desirable method of treatment is the so-called electronic treatment method which comprises exposing the film surface to a high voltage corona discharge while passing the film between a pair of spaced electrodes. After electronic treatment of the substrate film surface, it can be coated with the coating composition of the present invention which coating will then exhibit a tendency to more strongly adhere to the treated film surface.

In applications where even greater coating-to-film adherence is desired, i.e., greater than that resulting from treatment of the film surface by any of the aforediscussed methods, an intermediate primer coating can be employed. In this case, the film is first treated by one of the foregoing methods, electronic treatment being a preferred method, to provide increased active adhesive sites thereon (thereby promoting primer adhesion) and to the thus-treated film surface there is subsequently applied a continuous coating of a primer material. Primer materials which are suitable are well known in the prior art and include, for example, titanates and poly(ethylene imine). The primer is applied to the electronically treated base film by conventional solution coating means. An effective primer herein is poly(ethylene imine) applied as either an aqueous or organic solvent solution, e.g., of ethanol, containing about 0.5 wt % of the imine.

The pH of the terpolymer latex, adjusted if necessary to within a range of pH of from about 7 to about 10, and preferably from about 8 to about 9, is applied to the treated surface of the polymer film in any suitable manner such as by gravure coating, roll coating, dipping, spraying, etc. The excess aqueous solution can be removed by squeeze rolls, doctor knives, etc. The coating composition will ordinarily be applied in such an amount that there will be deposited following drying, a smooth, evenly distributed layer of from about 0.01 to about 0.04 mil thickness (equivalent to the application of from about 0.2 to about 0.8 grams per 1,000 sq. in of film when both sides of the film are being coated). In general, the thickness of the applied coating is such that it is sufficient to impart the desired heat sealability and stiffness characteristics to the substrate polymer film.

The coating once applied to the film is subsequently dried by hot air, radiant heat or by any other suitable means thereby providing a non-water soluble, clear, adherent, glossy coated film product useful, for example, as a packaging film.

EXAMPLE

The following general emulsion polymerization procedure was employed to provide eight acrylate latices.

A reaction vessel is charged with 1.2 liters of water and 1.8 grams of ammonium persulfate as a polymerization catalyst. To control latex particle size, 3.0 grams of Gafac RE-610 is added to the vessel either all before the polymerization or in two portions, before and during the polymerization. The reaction vessel is then heated to a temperature of approximately 80° C. with stirring. The following materials are mixed and added incrementally with stirring over a period of 3 hours:

a. methyl methacrylate (MMA)
b. methyl acrylate (MA)
c. methacrylic acid and (MAA)
d. 2.2 grams of ethyl mercaptoacetate as a molecular weight regulator Following completion of the monomer addition the reaction vessel is maintained at the reaction temperature of 80° C. for an additional 30 minutes.

The composition of the acrylate latices, their Tg values and their average particle sizes were as follows:

| Acrylate Latex | Monomer Composition MMA/MA/MAA Wt. % | Tg (°F.) | Average Particle Size (microns) |
|---|---|---|---|
| 1 | 49.4/50.6/0 | 120 | 0.12 |
| 2 | 48.1/49.9/2 | 120 | 0.35 |
| 3 | 42.5/53.5/4 | 120 | 0.52 |
| 4 | 58.1/41.9/0 | 135 | 0.07 |
| 5 | 54.6/43.4/2 | 135 | 0.15 |
| 6 | 51.5/44.5/4. | 135 | 0.38 |
| 7 | 59.3/36.7/4. | 150 | 0.10 |
| 8 | 59.3/36.7/4. | 150 | 0.40 |

Each of these eight latices was divided into three parts with each of the twenty-four resulting portions formulated to contain 0, 20 or 40 parts per hundred of colloidal silica (0.015–0.025 microns average particle size). Each of the coating compositions further contained 5 parts carnauba wax, 0.3 parts talc and 4 parts of a rosin derivative as described in U.S. Pat. No. 4,058,645, the contents of which are incorporated by reference herein, to improve the slip and moisture resistant properties of the compositions.

Each of the latex coating compositions was applied to the surface of biaxially oriented polypropylene film samples approximately 0.7 mils thick. Each film was produced from polypropylene resin identified as Eastman Tenite 423DF, a non-slip polypropylene having a high isotactic content and a melt index of 4.5. Following extrusion, the film was biaxially oriented utilizing a known procedure. The coatings were applied utilizing standard gravure coating apparatus and techniques. Before coating, the film had been treated by subjecting both surfaces thereof to electronic treatment and priming the electronically treated surfaces with a 0.5 wt % solution of poly(ethylene imine) in a mixture of 85 percent water and 15 percent ethanol. The total coating weight on the oriented, treated, primed film surface following drying of the film was approximately 0.6 grams/1,000 in.$^2$ of film, both sides of the film having been coated.

The twenty-four coated films were subsequently subjected to a variety of tests, the results of which are set forth in the following tables.

TABLE I

Optical Clarity of Coated Polymer Films

| Coated Film | Acrylate Latex | Silica (phr) | Optical Clarity |
|---|---|---|---|
| 1 | 1 | 0 | 5 |
| 2 | 1 | 20 | 5 |
| 3 | 1 | 40 | 5 |
| 4 | 2 | 0 | 5 |
| 5 | 2 | 20 | 5 |
| 6 | 2 | 40 | 5 |
| 7 | 3 | 0 | 4 |
| 8 | 3 | 20 | 3 |
| 9 | 3 | 40 | 2 |
| 10 | 4 | 0 | 5 |
| 11 | 4 | 20 | 5 |
| 12 | 4 | 40 | 4 |
| 13 | 5 | 0 | 5 |
| 14 | 5 | 20 | 4 |
| 15 | 5 | 40 | 4 |
| 16 | 6 | 0 | 2 |
| 17 | 6 | 20 | 1 |
| 18 | 6 | 40 | 1 |
| 19 | 7 | 0 | 5 |
| 20 | 7 | 20 | 4 |
| 21 | 7 | 40 | 2 |
| 22 | 8 | 0 | 4 |
| 23 | 8 | 20 | 1 |
| 24 | 8 | 40 | 1 |

Rating: 5 = excellent; 4 = good; 3 = fair; 2 = poor; 1 = very poor.

TABLE II

Properties of Coated Polymer Films

| Coated Film | Minimum Seal Temp. (°F.) | Seal Strength (g/in) | Blocking (g/in) | Coefficient of Friction | Hot Slip[a] |
|---|---|---|---|---|---|
| 1 | 205 | 321 | 1.2 | 1.0 | 1 |
| 2 | 208 | 300 | 2.2 | 0.36 | 2 |
| 3 | 213 | 326 | 1.6 | 0.40 | 4 |
| 4 | 200 | 281 | 1.2 | 1.0 | 1 |
| 5 | 200 | 331 | 3.4 | 0.39 | 2 |
| 6 | 212 | 280 | 3.2 | 0.38 | 4 |
| 7 | 211 | 293 | 1.5 | 1.0 | 1 |
| 8 | 220 | 275 | 3.0 | 0.45 | 2 |
| 9 | 243 | 154 | BTD[b] | 0.56 | 4 |
| 10 | 201 | 363 | 1.7 | 0.22 | 2 |
| 11 | 210 | 329 | 1.9 | 0.24 | 3 |
| 12 | 219 | 318 | 2.3 | 0.28 | 5 |
| 13 | 204 | 384 | 1.8 | 0.23 | 2 |
| 14 | 208 | 351 | 2.0 | 0.26 | 3 |
| 15 | 215 | 330 | 2.5 | 0.27 | 5 |
| 16 | 204 | 280 | 8.3 | 0.20 | 2 |
| 17 | 227 | 275 | BTD | 0.50 | 4 |
| 18 | 235 | 201 | BTD | 0.42 | 5 |
| 19 | 208 | 322 | 2.9 | 0.19 | 3 |
| 20 | 213 | 278 | 2.4 | 0.17 | 3 |

TABLE II-continued

| | Properties of Coated Polymer Films | | | | |
|---|---|---|---|---|---|
| Coated Film | Minimum Seal Temp. (°F.) | Seal Strength (g/in) | Blocking (g/in) | Coefficient of Friction | Hot Slip[a] |
| 21 | 216 | 280 | 5.8 | 0.38 | 5 |
| 22 | 216 | 278 | 2.4 | 0.17 | 2 |
| 23 | 217 | 281 | BTD | 0.39 | 3 |
| 24 | 286 | 53 | BTD | 0.45 | 4 |

[a]Rating: 5 = excellent; 4 = good; 3 = fair; 2 = poor; 1 = very poor.
[b]BTD: Block to destruction.

As these data show, the average particle size of the latex and the presence of inorganic hot slip agent are critical requirements of the coating composition if suitable properties are to be obtained. So, for example, the properties of coated films 3, 6, 12 and 15 were significantly superior to those of coated films 1, 4 and 10 (no silica hot slip agent) and 9, 18 and 24 (average particle size of the latex exceeded that required herein).

The film coating composition of this invention possesses a number of advantages over the ammonia-solubilized coating compositions of U.S. Pat. Nos. 3,753,769 and 4,058,645 discussed above. Thus, the coating composition herein can be more readily applied to a substrate polymer film (latices, as distinguished from solutions, have low viscosity even at high solids content). This permits the application of the coating composition at higher speed as less water must be evaporated. By dispensing with the addition of solubilizing ammonia, the latex coating composition can be achieved more simply and at lower cost.

What is claimed is:

1. In a heat sealable coating composition for application to a polymer film, wherein the composition contains (a) a film-forming aqueous latex based on an interpolymer or blend of at least one alkyl acrylate ester, at least one alkylmethacrylate ester and, one or more alpha, beta ethylenically unsaturated carboxylic acids, (b) a finely divided, water-insoluble inorganic particulate hot slip agent and (c) a wax-containing cold slip agent, the improvement wherein said interpolymer component of said aqueous latex has an average particle size of from about 0.03 to about 0.35 microns.

2. The coating composition of claim 1 in which the average particle size of the interpolymer component is from about 0.07 to 0.2 microns.

3. The coating composition of claim 1 in which the latex is prepared from (a) from about 1 to about 5 percent by weight of an alpha, beta monoethylenically unsaturated carboxylic acid selected from the group consisting of acrylic acid, methacrylic acid, and mixtures thereof, and (b) from about 95 to about 99 parts by weight of neutral monomer esters, said neutral monomer esters comprising (1) methyl acrylate or ethyl acrylate and (2) methyl methacrylate, said interpolymer comprising from about 30 percent to about 60 percent by weight of methyl methacrylte when said alkyl acrylate is methyl acrylate and from about 52.5 percent to about 69 percent by weight of methyl methacrylate when said alkyl acrylate is ethyl acrylate.

4. The coating composition of claim 1 in which the hot slip agent is colloidal silica.

5. The coating composition of claim 4 in which the colloidal silica possesses an average particle size of from about 0.02 to about 0.2 microns.

6. The coating composition of claim 1 containing from 20 to 60 weight percent hot slip agent based on the weight of terpolymer.

7. The coating composition of claim 1 wherein the aqueous latex comprises from about 85 to about 98 weight percent of the total composition 8. The coating composition of claim 7 in which the aqueous latex has a solids content of from about 10 percent to about 70 percent.

9. The coating composition of claim 7 in which the aqueous latex comprises from about 92 to about 97 weight percent of the total composition.

10. The coating composition of claim 9 in which the aqueous latex has a solids content of from about 30 percent to about 60 percent.

11. The coating composition of claim 1 applied to a polymer film to render said polymer film heat sealable.

12. The coating composition of claim 2 applied to a polymer film to render said polymer film heat sealable.

13. The coating composition of claim 3 applied to a polymer film to render said polymer film heat sealable.

14. The coating composition of claim 4 applied to a polymer film to render said polymer film heat sealable.

15. The coating composition of claim 5 applied to a polymer film to render said polymer film heat sealable.

16. The coating composition of claim 6 applied to a polymer film to render said polymer film heat sealable.

17. The coating composition of claim 7 applied to a polymer film to render said polymer film heat sealable.

18. The coating composition of claim 8 applied to a polymer film to render said polymer film heat sealable.

19. The coating composition of claim 9 applied to a polymer film to render said polymer film heat sealable.

20. The coating composition of claim 10 applied to a polymer film to render said polymer film heat sealable.

* * * * *